US009172584B1

(12) United States Patent
Lai

(10) Patent No.: US 9,172,584 B1
(45) Date of Patent: Oct. 27, 2015

(54) METHOD AND SYSTEM FOR HIGH-AVAILABILITY CLUSTER DATA PROTECTION

(71) Applicant: EMC Corporation, Hopkinton, MA (US)

(72) Inventor: Lei Lai, Mississauga (CA)

(73) Assignee: EMC CORPORATION, Hopkinton, MA (US)

( * ) Notice: Subject to any disclaimer, the term of this patent is extended or adjusted under 35 U.S.C. 154(b) by 321 days.

(21) Appl. No.: 13/624,013

(22) Filed: Sep. 21, 2012

(51) Int. Cl.
G06F 15/16 (2006.01)
H04L 29/08 (2006.01)
H04L 29/06 (2006.01)

(52) U.S. Cl.
CPC .......... *H04L 29/08072* (2013.01); *H04L 29/06* (2013.01); *H04L 29/0809* (2013.01)

(58) Field of Classification Search
CPC .................................................. G06F 11/2023
See application file for complete search history.

(56) References Cited

U.S. PATENT DOCUMENTS

| 7,496,783 | B1* | 2/2009 | Graf et al. ..................... 714/4.11 |
| 7,739,543 | B1* | 6/2010 | Pittman et al. ................ 714/6.32 |
| 8,219,769 | B1* | 7/2012 | Wilk .............................. 711/162 |
| 8,484,163 | B1* | 7/2013 | Yucel et al. .................... 707/640 |
| 2002/0049857 | A1* | 4/2002 | Farber et al. .................. 709/245 |
| 2005/0086379 | A1* | 4/2005 | Asami ........................... 709/245 |
| 2006/0047776 | A1* | 3/2006 | Chieng et al. ................. 709/217 |
| 2007/0282979 | A1* | 12/2007 | Tuel .............................. 709/219 |
| 2009/0254649 | A1* | 10/2009 | Coffey et al. ................. 709/224 |
| 2010/0064168 | A1* | 3/2010 | Smoot et al. ...................... 714/6 |
| 2010/0287263 | A1* | 11/2010 | Liu et al. ....................... 709/221 |
| 2012/0047394 | A1* | 2/2012 | Jain et al. ...................... 714/4.11 |
| 2012/0150808 | A1* | 6/2012 | Hubner et al. ................. 707/652 |

* cited by examiner

*Primary Examiner* — Brian J Gillis
*Assistant Examiner* — Kamran Mohammadi
(74) *Attorney, Agent, or Firm* — Dergosits & Noah LLP; Todd A. Noah

(57) ABSTRACT

High-availability cluster data protection is described. A computer executes a framework and a task dispatcher. The framework disables caching of internet protocol addresses queried from a network interface configuration of the computer. The task dispatcher receives a request to execute a data protection task, and determines whether the request is for a current cluster node. If the request is not for a current cluster node, the task dispatcher determines whether the request is for a logical host. If the request is for the logical host, the task dispatcher queries the network interface configuration to determine whether the internet protocol address of the logical host is locally available. If the internet protocol address of the logical host is locally available, the task dispatcher directs the request locally. If the internet protocol address of the logical host is not locally available, the task dispatcher directs the request to a remote node.

17 Claims, 3 Drawing Sheets

METHOD AND SYSTEM FOR HIGH-AVAILABILITY CLUSTER DATA PROTECTION

BACKGROUND

High-availability clusters, also known as failover clusters, are groups of computers that support server applications which can be reliably utilized with a minimum of down-time. High-availability clusters operate by harnessing redundant computers, or nodes, in groups or clusters that provide continued service when system components fail. If a server executing a specific application crashes without the support of a high-availability cluster, the specific application may be unavailable until the crashed server is fixed. High-availability clusters remedy such a server crashing situation by detecting hardware and/or software faults, and immediately restarting the specific application on another computer system without requiring administrative intervention, a process known as failover. As part of this process, clustering software may configure another computer system before starting the specific application on the other computer system. For example, appropriate file systems may need to be imported and mounted, network hardware may have to be configured, and some supporting applications may need to be running as well.

High-availability clusters are often used for critical databases, file sharing on a network, business applications, and customer services, such as electronic commerce websites. High-availability cluster implementations build redundancy into a cluster to eliminate single points of failure, including multiple network connections and data storage which is redundantly connected via storage area networks. High-availability clusters typically use a heartbeat private network connection to monitor the health and status of each node in the cluster. The term logical host or cluster logical host is used to describe the network address which is used to access services provided by a high-availability cluster. This logical host identity is not tied to a single cluster node. The logical host identity is actually a network address or hostname that is linked with the service(s) provided by the cluster. The term "logical host" may refer to a server application identified by the logical host identity. If a cluster node with a running database goes down, the database will be restarted on another cluster node, and the network address used to access the database will reference the new node so that the users can access the database again.

Data may be protected for a server application through the execution of a backup program that creates a backup of the data for the server application, and the execution of a restore program that restores the data for the server application from a previous backup of the data for the server application. Two key issues need to be addressed for a backup and restore application to protect data within a high-availability cluster environment. First, a backup and restore application needs to determine the unique owning host of each file system path name so that the backup and restore application has a consistent view of data no matter which high-availability cluster node is executing a server application. Second, if a server application is configured to be periodically backed up, then the backup and restore application is responsible for directing the backup program to the correct high-availability cluster node. Because server applications may fail over between high-availability cluster nodes, the backup and restore application's functionality does not necessarily apply to the same high-availability cluster node for a specific server application all of the time.

The resolution for the above two issues is implemented by a software framework that provides a platform independent solution for various high-availability cluster software on various platforms. The software framework uses a map object that queries the high-availability cluster configuration to provide a generally static "Internet Protocol address to file system path name" mapping. The map object is a program specific to the platform and high-availability cluster, but the software framework normalizes the output to be generic, such that the map object can be processed in a platform independent way. This normalization abstracts the logic of different high-availability clusters for the backup and restore application, and allows the decoupling of the backup and restore application from high-availability cluster product internals.

Using a software framework to address the first key issue of applying a backup and restore application to high-availability clusters is relatively straight forward. The output of the map object is presented in a normalized format in which an Internet Protocol address and its owning file system path names are grouped together. Therefore the ownership of each file system path is uniquely determined. The mapping from an Internet Protocol address to its owning file system path names is cached in an internal data structure to reduce subsequent executions of the map object because some operating systems or high-availability cluster commands called by the map object are considered expensive, especially for high-availability clusters with a large number of server applications. Because the mapping from an Internet Protocol address to its owning file system path names is rather stable in usual situations (that is, the cluster configuration does not change frequently in a production environment), it is reasonable to set the cache timeout value to be 30 days or even 365 days.

Using a software framework to address the second key issue of applying a backup and restore application to high-availability clusters is more challenging. When the task dispatcher of the backup and restore application receives a task request, the task dispatcher needs to direct the backup or restore task request to the correct node. While directing the task request is not an issue for a standalone environment, the challenge for a high-availability cluster environment is the uncertainty of which node is executing the target application at the moment. The backup and restore application may be executed in a high availability cluster environment itself. Furthermore, the method to direct a local task request and the method to direct a remote task request are different. Therefore the key for resolving the second issue is determining whether or not the destination of the task request is the local node that is executing the task dispatcher. The prior art solution for checking whether the task request destination is the local node is based on the output of the map object, which is cached in an internal data structure, to obtain the list of logical hosts executing on the local node. The subsequent task requests may or may not call the map object to update the cache, depending on when the cache was built relative to a defined time frame.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
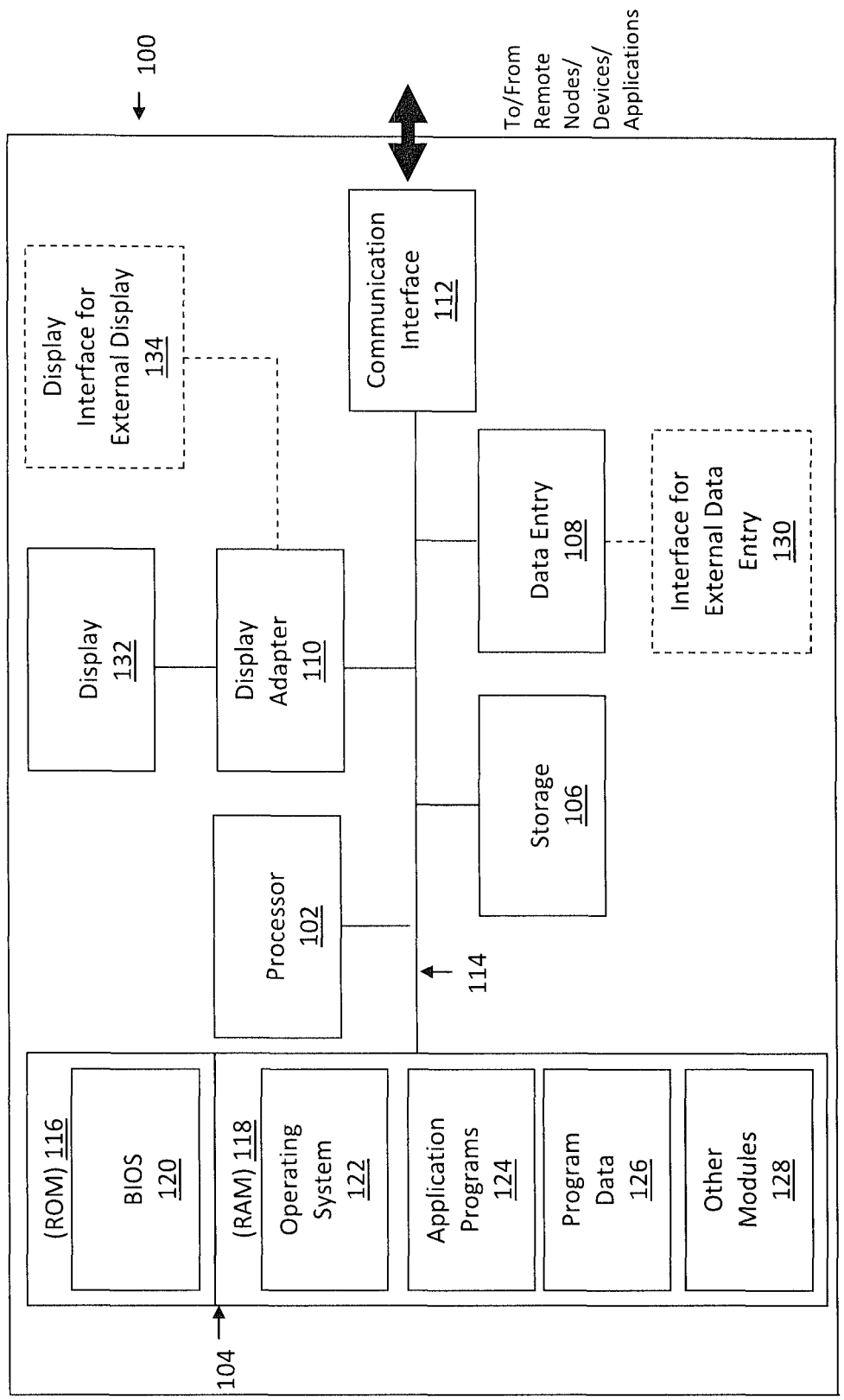
FIG. 1 is a block diagram illustrating an example hardware device in which the subject matter may be implemented.

There are three problems with the prior art approach for applying the backup and restore application to the correct high-availability cluster node. First, there are still chances that a task request is being directed to the wrong node. For example, a server application was executing on the same node as the task dispatcher for a backup and restore application, and the server application is failed over to another node within the defined cache window. In this situation, the task dispatcher will direct the task request to the local node that runs the task dispatcher because the cached logical hosts list still identifies the server application as executing on the local node, while in fact the task dispatcher should direct the task request to the node where the server application has been failed over. Because of the uncertainty of failover situations and the need to ensure the correctness of the task dispatch result, the practical timeout value of the mapping cache is small, a few seconds, in contrast to the 30 days or 365 days cache timeout value previously mentioned, which is purposed for capturing the cluster configuration changes. However, the small time frame results in the second problem, the performance of the backup and restore application may be significantly impacted if the map object takes a few seconds or longer to execute. The reason is, due to the comprehensiveness of the backup and restore application, the map object may need to be called multiple times within a single backup or restore operation. For example, the map object shall be called during the initialization and the authentication of internal programs of the backup and restore application. The third problem is that the return of the map object contains more information than what is needed for the task dispatcher because the owning file system path names part of information and the information about logical hosts other than the task destination is unnecessary. Therefore, the task dispatcher needs to parse the output of the map object to get the needed result, which is not cost efficient as some file system path names may be up to 4096 bytes in length.

The subject matter presented herein provides high-availability cluster data protection that offers solutions to prior art problems. The need to determine whether the request destination is the local node is addressed by the task dispatcher checking if the Internet Protocol address of the destination logical host is configured on the network interface of the local node. To ensure the correctness of the result, the software framework does not cache the resulting Internet Protocol addresses from querying the network interface configuration of the computer executing the task dispatcher. There should be no noticeable performance impact on the operation of the data protection task because only a few high efficiency system calls are involved in checking the Internet Protocol addresses configured on the network interface of the computer.

When the task dispatcher receives a request to execute a data protection task, the task dispatcher determines whether the request is for the current cluster node, the computer that is executing the task dispatcher. If the request is not for the current cluster node, the task dispatcher determines whether the request is for a logical host. If the request is for the logical host, the task dispatcher queries the network interface configuration to determine whether the Internet Protocol address of the logical host is locally available. If the network interface configuration indicates that the Internet Protocol address of the logical host is locally available, the task dispatcher directs the request locally. If the network interface configuration indicates that the Internet Protocol address of the logical host is not locally available, the task dispatcher directs the request to a remote node.

This improved approach avoids all three problems identified for the prior art solution. First, the task dispatcher directs the task request for a server application to the correct node where the server application is executing because the task dispatcher can query the network interface configuration to accurately determine whether the Internet Protocol address of the server application is available locally. Second, because there is no need for the task dispatcher to call the map object, the delays caused by some expensive operating system or high-availability cluster commands are avoided. Third, the task dispatcher obtains no extra information when the task dispatcher decides where to direct the task request. The task dispatcher queries exactly what is needed and does not need to parse the return.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for high-availability cluster data protection.

The prior art approach for high-availability cluster data protection may direct a task request to the wrong node after accessing a map object, and the performance of the backup and restore application may be significantly impacted if the map object takes a few seconds or longer to execute. Furthermore, the task dispatcher needs to parse the output of the map object to get the needed result, which is not cost efficient as some file system path names may be up to 4096 bytes in length.

Embodiments herein offer solutions to prior art problems by providing high-availability cluster data protection. The task dispatcher directs the task request for a server application to the correct node where the server application is executing because the task dispatcher can query the network interface configuration to accurately determine whether the Internet Protocol address of the server application is available locally. There is no need for the task dispatcher to call the map object, thereby avoiding the delays caused by some expensive operating system or high-availability cluster commands. The task dispatcher queries exactly what is needed and does not need to parse the return because the task dispatcher obtains no extra information when the task dispatcher decides where to direct the task request.

Figure 2:
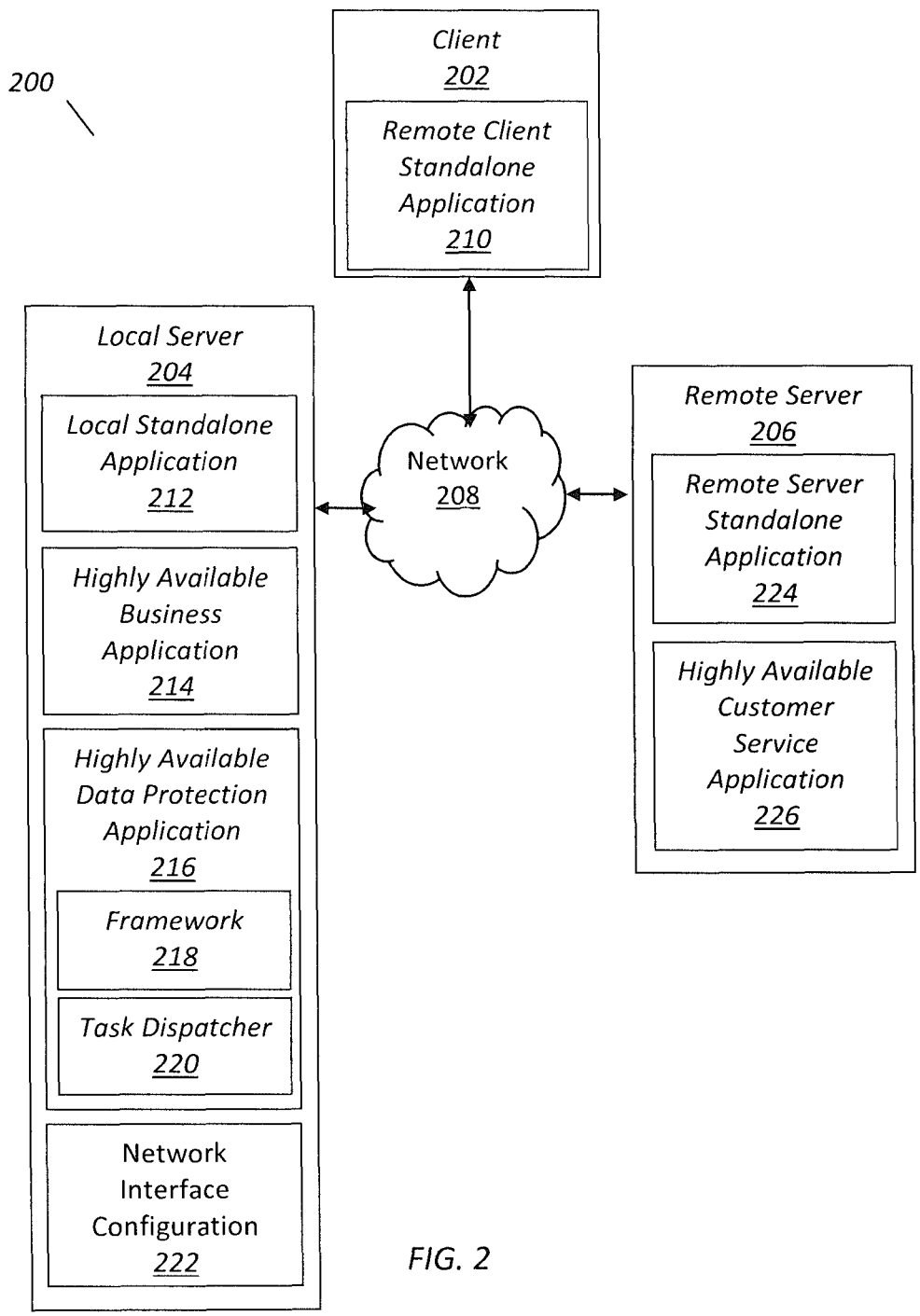
FIG. 2 illustrates a block diagram of an example system for high-availability cluster data protection, under an embodiment.

FIG. 2 illustrates a block diagram of a system 200 that implements high-availability cluster data protection, under an embodiment. The system 200 may be portable, such that it can protect data in many different high-availability cluster environments. The system 200 is scalable, such that the system 200 may protect data on anywhere from a cluster of two computers to clusters of thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, a local server 204, and a remote server 206, which are provided by a hosting company. The local server 204 and the remote server 206 are two nodes in a cluster system. In contrast, the client 202 is a standalone machine that is outside of the cluster system, such that the client 202 cannot host any highly available server application, and hence has nothing to do with the logical hosts. The client 202 and the servers 204-206 communicate via a network 208. Although FIG. 2 depicts the system 200 with one client 202, two servers 204-206, and one network 208, the system 200 may include any number of clients 202, any number of servers 204-206, and any number of networks 208. Each of the client 202 and the servers 204-206 is substantially similar to the system 100 depicted in FIG. 1. The client 202 enables a user to communicate with the servers 204-206.

The client 202 executes a remote client standalone application 210. The local server 204, which is one of the cluster nodes, executes, a local standalone application 212, a highly available business application 214, and a highly available data protection application 216, but the local server 204 may execute any number and any type of applications. The highly available data protection application 216 includes a framework 218 and a task dispatcher 220. The local server 204 also includes network interface configuration 222, which is part of the operating system 122 in FIG. 1. The network interface configuration 222 records all of the Internet Protocol addresses available on the local server 204. The remote server 206, which is the other cluster node for the local server 204, executes a remote standalone application 224 and a highly available customer service application 226, but the remote server 206 may execute any number and any type of applications.

The system 200 uses the terms "local" and "remote" relative to the task dispatcher 220 for the highly available data protection application 216. For example, the local server 204 is referred to as "local" because execution of the task dispatcher 220 for the highly available data protection application 216 is local to the local server 204. Likewise, the local standalone application 212 is referred to as "local" because execution of the task dispatcher 220 for the highly available data protection application 216 is local to the local server 204 that executes the local standalone application 212. In another example, the remote server 206 is referred to as "remote" because execution of the task dispatcher 220 for the highly available data protection application 216 is remote to the remote server 206. Similarly, the remote standalone application 224 is referred to as "remote" because execution of the task dispatcher 220 for the highly available data protection application 216 is remote to the remote server 206 that executes the remote standalone application 224.

The system 200 is described below with three highly available applications, the highly available business application 214, the highly available data protection application 216, and the highly available customer service application 226, which may fail over between the local server 204 and the remote server 206 as part of a high-availability cluster. Once the highly available data protection application 216 is initiated, the framework 218 disables in itself the caching of Internet Protocol addresses queried from the network interface configuration 222 of the local server 204 executing the task dispatcher 220 for the highly available data protection application 216. For example, when the highly available data protection application 216 is automatically initiated to periodically back up the data for the customer service logical host, the framework 218 does not cache the Internet Protocol addresses queried from the network interface configuration 222 to determine which node in the high availability cluster is currently executing the highly available customer service application 226.

When the task dispatcher 220 receives a request to execute a data protection task, the task dispatcher 220 determines whether the request is for the current cluster node, the local server 204 that is executing the task dispatcher 220. The task dispatcher 220 may determine whether the request is for the current cluster node based on whether the task destination is specified as a loopback network address (or its aliases) or not. If the request is for the current cluster node, the task dispatcher 220 directs the request locally. For example, if a backup task request is for the local standalone application 212, the task dispatcher 220 directs the backup task request locally to the local server 204 that executes the local standalone application 212.

If the request is not for the current cluster node, the task dispatcher 220 determines whether the request is for a logical host or a remote standalone application. For example, if a backup task request is not for the local server 204, the task dispatcher 220 determines whether the backup task request is for a logical host, such as the highly available business application 214 or the highly available customer service application 226. The task dispatcher 220 determines whether the request is for a logical host based on the information provided by the framework 218. If the Internet Protocol address of the task destination is listed in the Internet Protocol addresses in the cluster map, then the request is for a server application in the cluster, which is identified by the logical host. Otherwise the request is not for a server application in the cluster. If the request is not for the logical host, the task dispatcher 220 directs the request to a remote node. For example, since the backup task request is for the remote server standalone application 224, the task dispatcher 220 directs the backup task request to the remote server 206.

If the request is for a logical host, the task dispatcher 220 queries the network interface configuration 222 to determine whether the Internet Protocol address of the logical host is locally available. The task dispatcher 220 determines whether the request is for a local logical host based on whether the Internet Protocol address of the logical host is available on the network interface configuration on the local server 204. If the Internet Protocol address of the logical host is locally available, the task dispatcher 220 directs the request locally. For example, since the highly available business application 214 is a logical host that is locally available, the task dispatcher 220 directs the backup task request locally to the local server 204, which executes the highly available business application 214.

If the Internet Protocol address of the logical host is not locally available, the task dispatcher 220 directs the request to a remote cluster node. For example, since the highly available customer service application 226 is a logical host that is not locally available, the task dispatcher 220 directs the backup task request remotely to the remote server 206, which executes the highly available customer service application 226. In this example, the highly available customer service application 226 may have failed from the local server 204 to the remote server 206 one second previously when the local server 204 lost access to the resources required to support the functionality of the highly available customer service application 226. The cached map object would still indicate that the local server 204 is executing the highly available customer service application 226. However, the disabling of caching of Internet Protocol addresses queried from the network interface configuration 222 results in accurately identifying the remote server 206 as the node which is currently executing the highly available customer service application 226.

Furthermore, there is no need for the task dispatcher 220 to call the map object, thereby avoiding the delays caused by some expensive operating system or high-availability cluster commands. The task dispatcher 220 queries exactly what is needed and does not need to parse the return because the task dispatcher 220 obtains no extra information when the task dispatcher 220 decides where to direct the task request.

Figure 3:
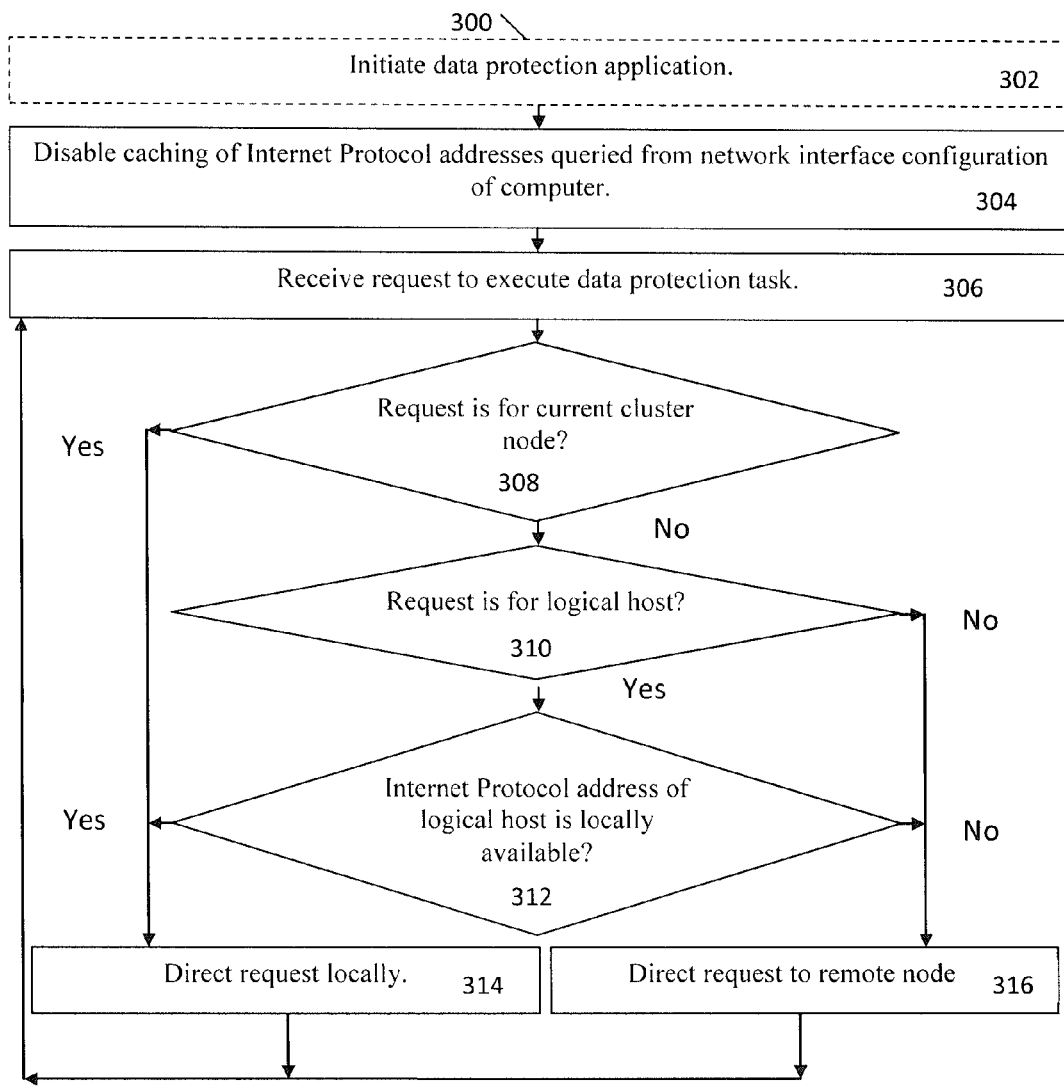
FIG. 3 is a flowchart that illustrates a method of high-availability cluster data protection, under an embodiment.

FIG. 3 is a flowchart that illustrates a method of high-availability cluster data protection. Flowchart 300 illustrates method acts illustrated as flowchart blocks for certain steps involved in and between the client 202 and the servers 204-206 of FIG. 2.

A data protection application is optionally initiated, act 302. For example, the local server 204 automatically initiates the highly available data protection application 216 to periodically back up the data for the highly available customer service application 226.

Caching of Internet Protocol addresses queried from the network interface configuration of a computer is disabled for the framework, act 304. For example, the framework 218 does not cache the Internet Protocol addresses on the network interface configuration 222 of the local server 204 executing the task dispatcher 220.

A request is received to execute a data protection task, act 306. For example, the task dispatcher 220 receives a request to back up the data for the logical host for the highly available customer service application 226.

A determination is made whether a request is for a current cluster node, act 308. For example, the task dispatcher 220 determines whether the backup task request is for the current cluster node, the local server 204 that is executing the task dispatcher 220. If the request is for the current cluster node, the method 300 proceeds to act 314. For example, if a backup task request is for the local standalone application 212, the method 300 proceeds to act 314. If the request is not for the current cluster node, the method 300 continues to act 310. For example, if a backup task request is for the logical host for the highly available customer service application 226, the method 300 continues to act 310.

A determination is made whether a request is for a logical host, act 310. For example, the task dispatcher 220 determines whether a backup task request is for a logical host. If the request is for a logical host, the method 300 continues to act 312. For example, since the backup task request is for the logical host for the highly available customer service application 226, the method 300 continues to act 312. If the request is not for the logical host, the method 300 proceeds to act 316. For example, since the backup task request is for the remote standalone application 224, the method 300 proceeds to act 316.

A determination is made whether an Internet Protocol address of logical host is locally available, act 312. If the network interface configuration 222 indicates that the Internet Protocol address of the logical host is locally available, the method 300 continues to act 314. For example, since the highly available business application 214 is a logical host that is locally available, the method 300 continues to act 314. If the network interface configuration 222 indicates that the Internet Protocol address of the logical host is not locally available, the method 300 proceeds to act 316. For example, since the highly available customer service application 226 is a logical host that is not locally available, the method 300 proceeds to act 316.

A request is directed locally, act 314. For example, since the highly available business application 214 is a logical host that is locally available, the task dispatcher 220 directs the backup task request locally to the local server 204, which executes the highly available business application 214. The method 300 returns to act 306 to receive additional requests to execute data protection tasks.

A request is directed to a remote node, act 316. For example, since the highly available customer service application 226 is a logical host that is not locally available, the task dispatcher 220 directs the backup task request remotely to the remote server 206, which executes the highly available customer service application 226. The method 300 returns to act 306 to receive additional requests to execute data protection tasks.

Although FIG. 3 depicts the acts 302-316 occurring in a specific order, the acts 302-316 may occur in another order. The high-availability data protection described herein enables the task dispatcher 220 to direct the task request for a server application to the correct node where the server application is executing because the task dispatcher 220 can access the network interface configuration 222 to accurately determine whether the Internet Protocol address of the server application is available locally. There is no need for the task dispatcher 220 to call the map object, thereby avoiding the delays caused by some expensive operating system or high-availability cluster commands. The task dispatcher 220 queries exactly what is needed and does not need to parse the return because the task dispatcher 220 obtains no extra information when the task dispatcher 220 decides where to direct the task request.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for high-availability cluster data protection, the system comprising:
one or more processors coupled to a non-transitory computer-readable medium;
a processor-based application stored on the non-transitory computer-readable medium, the processor-based application having:
a framework, which when executed, will cause the one or more processors to disable caching of internet protocol addresses queried from a network interface configuration of the computer in response to an initiation of a data protection application and query a cluster configuration of a cluster system to create a cluster map, wherein the cluster map comprises a list of internet protocol addresses associated with applications that provide services to the cluster; and a task dispatcher, which when executed, will cause the one or more processors to:
receive a request to execute a data protection task;
determine whether the request is for a current cluster node;
determine whether the request is for a logical host by comparing the internet protocol address associated with the destination of the request with the list of internet protocol addresses from the cluster map in response to a determination that the request is not for a current cluster node;
query the network interface configuration to determine whether the internet protocol address of the logical host is locally available in response to a determination that the request is for the logical host;
direct the request locally in response to a determination that the internet protocol address of the logical host is locally available; and
direct the request to a remote node in response to a determination that the internet protocol address of the logical host is not locally available.

2. The system of claim 1, wherein the data protection task is associated with at least one of a backup application and a restore application.

3. The system of claim 1, wherein the current cluster node comprises the computer.

4. The system of claim 1, wherein the task dispatcher is further configured to direct the request locally in response to a determination that the request is for the current cluster node.

5. The system of claim 1, wherein the task dispatcher is further configured to direct the request to the remote node in response to a determination that the request is not for the logical host.

6. A computer-implemented method for high-availability cluster data protection, the method comprising:
disabling caching of internet protocol addresses queried from a network interface configuration of a computer in response to an initiation of a data protection application;
querying a cluster configuration of a cluster system to create a cluster map, wherein the cluster map comprises a list of internet protocol addresses associated with applications that provide services to the cluster;
receiving a request to execute a data protection task;
determining whether the request is for a current cluster node;
determining whether the request is for a logical host by comparing the internet protocol address associated with the destination of the request with the list of internet protocol addresses from the cluster map in response to a determination that the request is not for a current cluster node;
querying the network interface configuration to determine whether the internet protocol address of the logical host is locally available in response to a determination that the request is for the logical host; and
directing the request to a remote node in response to a determination that the internet protocol address of the logical host is not locally available.

7. The method of claim 6, wherein the data protection task is associated with at least one of a backup application and a restore application.

8. The method of claim 6, wherein the current cluster node comprises the computer.

9. The method of claim 6, further comprising directing the request locally in response to a determination that the request is for the current cluster node.

10. The method of claim 6, further comprising directing the request to the remote node in response to a determination that the request is not for the logical host.

11. The method of claim 6, further comprising directing the request locally in response to a determination that the internet protocol address of the logical host is locally available.

12. A computer program product, comprising a computer-readable program code to be executed by one or more processors when retrieved from a non-transitory computer readable medium, the computer-readable program code including instructions to:

disable caching of internet protocol addresses queried from the network interface configuration of a computer in response to an initiation of a data protection application;

query a cluster configuration of a cluster system to create a cluster map, wherein the cluster map comprises a list of internet protocol addresses associated with applications that provide services to the cluster;

receive a request to execute a data protection task;

determine whether the request is for a current cluster node;

determine whether the request is for a logical host by comparing the internet protocol address associated with the destination of the request with the list of internet protocol addresses from the cluster map in response to a determination that the request is not for a current cluster node;

query the network interface configuration to determine whether the internet protocol address of the logical host is locally available in response to a determination that the request is for the logical host; and direct the request locally in response to a determination that the internet protocol address of the logical host is locally available.

13. The computer program product of claim 12, wherein the data protection task is associated with at least one of a backup application and a restore application.

14. The computer program product of claim 12, wherein the current cluster node comprises the computer.

15. The computer program product of claim 12, further comprising computer-readable program code including instructions to direct the request locally in response to a determination that the request is for the current cluster node.

16. The computer program product of claim 12, further comprising computer-readable program code including instructions to direct the request to the remote node in response to a determination that the request is not for the logical host.

17. The computer program product of claim 12, further comprising computer-readable program code including instructions to direct the request to a remote node in response to a determination that the internet protocol address of the logical host is not locally available.

* * * * *